United States Patent
Kao et al.

(10) Patent No.: US 12,506,974 B2
(45) Date of Patent: Dec. 23, 2025

(54) REDUCING IMAGE FLICKERING OF WEBCAMS

(71) Applicant: Dell Products L.P., Round Rock, TX (US)

(72) Inventors: Chih-Hao Kao, Singapore (SG); Wei Wei Wilson Chua, Singapore (SG); Jin Shiong Koh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/534,064

(22) Filed: Dec. 8, 2023

(65) Prior Publication Data

US 2025/0193532 A1    Jun. 12, 2025

(51) Int. Cl.
| | |
|---|---|
| *H04N 23/745* | (2023.01) |
| *H04N 23/71* | (2023.01) |
| *H04N 23/72* | (2023.01) |
| *H04N 23/73* | (2023.01) |
| *H04N 23/74* | (2023.01) |
| *H04N 23/75* | (2023.01) |

(52) U.S. Cl.
CPC ........... *H04N 23/745* (2023.01); *H04N 23/71* (2023.01); *H04N 23/72* (2023.01); *H04N 23/73* (2023.01); *H04N 23/74* (2023.01); *H04N 23/75* (2023.01)

(58) Field of Classification Search
CPC ........ H04N 23/71; H04N 23/72; H04N 23/73; H04N 23/74; H04N 23/745; H04N 23/75
See application file for complete search history.

(56) References Cited

U.S. PATENT DOCUMENTS

| | | | | |
|---|---|---|---|---|
| 5,255,088 A | * | 10/1993 | Thompson | H04N 7/18 348/90 |
| 2007/0139792 A1 | * | 6/2007 | Sayag | G02B 5/23 359/739 |
| 2010/0026820 A1 | * | 2/2010 | Senoo | H04N 23/683 348/E5.037 |
| 2023/0053120 A1 | * | 2/2023 | Jamali | G02F 1/157 |
| 2025/0106359 A1 | * | 3/2025 | Huh | H04N 23/57 |

* cited by examiner

*Primary Examiner* — Antoinette T Spinks

(74) *Attorney, Agent, or Firm* — Terrile, Cannatti & Chambers, LLP; Emmanuel A. Rivera

(57) ABSTRACT

Described are systems and methods to reduce image flickering of a webcam of an information handling system. The webcam includes a photochromic lens that changes translucency based on UV radiation that is received. Image flickering can be caused when high UV radiation from a strong light source is observed. In passive method, the photochromic lens darkens as high UV radiation is received, and light received by the sensor of the webcam is reduced, which leads to lower shutter speed that reduces image flicker. In active methods, the image signal processor or an application is used to detect image flicker. UV emitters included in the webcam provide the UV radiation to cause the photochromic lens to darken.

12 Claims, 6 Drawing Sheets

REDUCING IMAGE FLICKERING OF WEBCAMS

BACKGROUND OF THE INVENTION

Field of the Invention

The present invention relates to information handling systems. More specifically, embodiments of the invention provide for eliminating image flickering in cameras or webcams of information handling systems.

Description of the Related Art

As the value and use of information continues to increase, individuals and businesses seek additional ways to process and store information. One option available to users is information handling systems or IHS. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems (IHS) may include a variety of hardware and software components that may be configured to process, store, and communicate information and may include one or more computer systems, data storage systems, and networking systems.

Information handling systems (IHS), such as desktop computers, laptop/notebook computers, tablets, smartphones, etc. can include a display, such as an external monitor, or built in screen. In addition, an IHS can include an external or built camera or webcam. Image flickering can occur in cameras or webcams, and seen on the display, when a source of light received compounded with IHS AC power frequency is not in sync with the shutter or exposure timing of the camera or webcam. Such image flickering condition is frequently observed when a strong outdoor light is mixed with indoor light.

Image flickering can be more apparent in cameras or webcams that implement relatively large pixel size sensors providing good light sensitivity, and having relatively larger aperture lenses. Such design implementations can provide good low light performance, provide low optical noise, and support fast shutter speeds; however, can suffer from the described image flickering.

Anti-flickering solutions have been provided for cameras and webcams, such as cameras or webcams implemented on smartphones. Such solution do not resolve image flickering under bright lighting conditions, such as when the camera or webcam faces strong day light along with a fluorescent indoor light. A faster shutter speed is used for auto exposure, and image flickering occurs due to the fluorescent indoor light.

SUMMARY OF THE INVENTION

A method, system, and computer-readable medium for reducing image flickering of a webcam of an information handling system (IHS) comprising receiving UV radiation by a photochromic lens of the IHS; changing translucency of the photochromic lens based on the received UV radiation; and adjusting the shutter speed of the webcam by a sensor of the webcam from light passing through the photochromic lens.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In various implementations, a photochromic lens is a glass cover for a camera or webcam. The photochromic lens is used as a filter to reduce the amount of light that enters a sensor of the camera or webcam, when a strong light source (e.g., outdoor light) is mixed with indoor lighting (e.g., normal light) condition. When the amount of light received by the sensor is reduced, shutter speed of the camera or webcam is reduced, and image flickering is resolved.

Depending on the amount of ultraviolet (UV) light detected by the photochromic lens, the amount of light that is allowed to enter is limited by the photochromic lens. The greater the amount of UV detected; the lesser amount of light is allowed to enter/pass through.

In certain implementations, a "passive" method is performed. The use of a photochromic lens as a glass cover provides that the photochromic lens will darken with increasing amounts of UV light that is detected or received. As the photochromic lens darkens, the amount of light entering is reduced.

In certain implementations, an "active" method is performed. Camera or webcam shutter speed is determined and "scene detect" is used to determine image flickering. When image flickering is determined, UV emitter(s) that are built in the webcam are progressively turned on to cause the photochromic lens to darken and reduce the amount of light that enters the sensor. The shutter speed is reduced to address the image flickering. The UV emitter(s) continue to emit until the camera or webcam is disabled.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
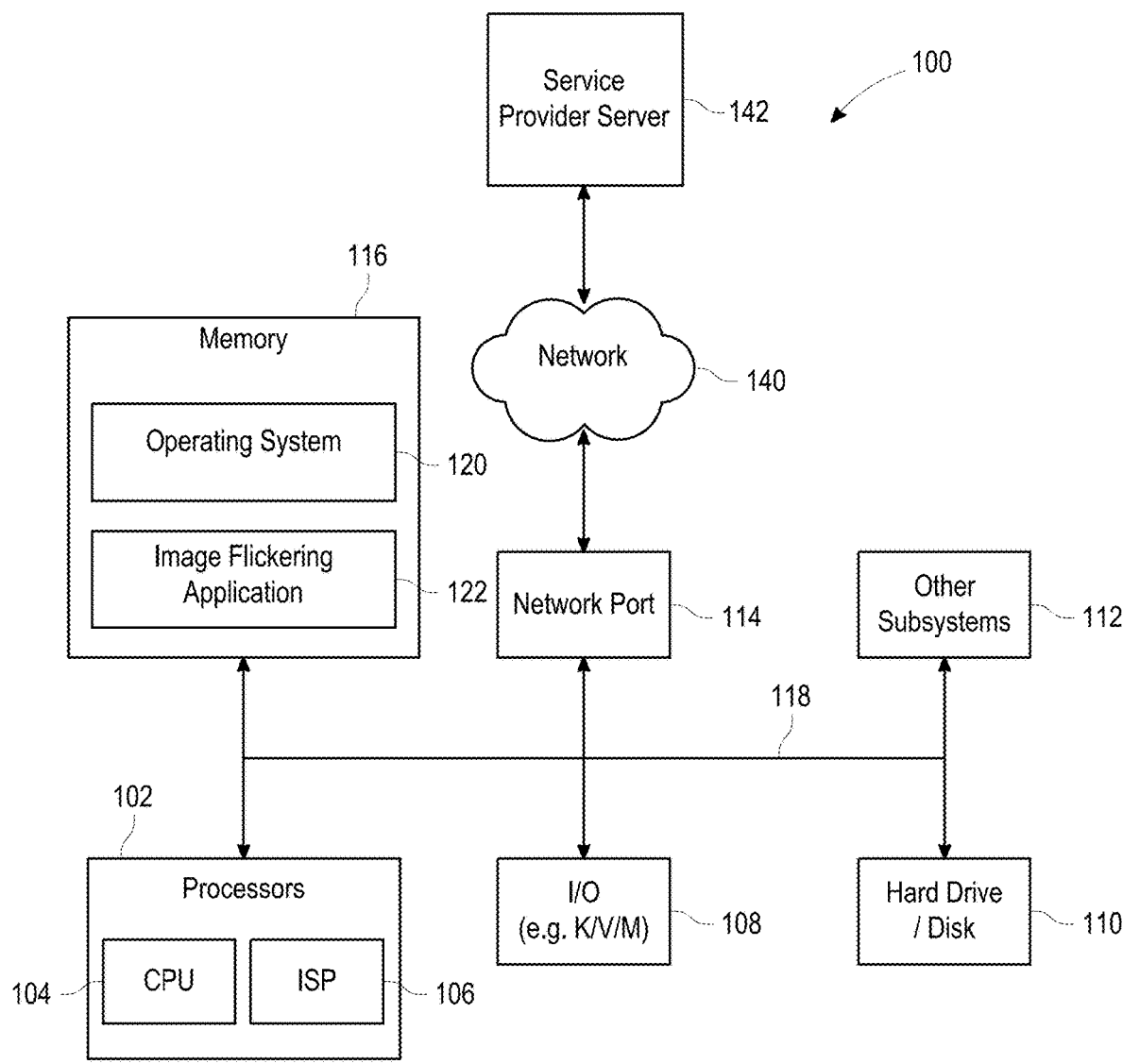
FIG. 1 is a general illustration of components of an information handling system as implemented in the present invention.

FIG. 1 is a generalized illustration of an information handling system 100. The information handling system 100 can be implemented as a computer, such as a desktop, server, tablet, laptop, or notebook, smartphone with built in camera and display, etc. The information handling system 100 includes processor(s) 102, such as a central processor unit or "CPU" 104 and an image signal processor or "ISP" 106. The information handling system 100 further includes input/output (I/O) devices 108, such as a microphone, a keyboard, a video/display, a mouse, and associated controllers (e.g., K/V/M), a hard drive or disk storage 110, and various other subsystems 112.

Various implementations provide for the I/O devices 108 to be external peripheral devices, such as keyboards, webcams, monitors, displays, etc. In particular, I/O devices 108 can include cameras, such as webcams, as further described herein.

Implementations provide for such external devices are connected using cables based on standards such as universal serial bus (USB), including USB Type C. In certain, implementations, cameras, such web cameras described herein are external devices that are connected by the cables implementing standards, such as USB. Webcam can be the internal device as well such as embedded into a display or laptop.

In various embodiments, the information handling system 100 also includes network port 114 operable to connect to a network 140, where network 140 can include one or more wired and wireless networks, including the Internet. Network 140 is likewise accessible by a service provider server 142. The information handling system 100 likewise includes system memory 116, which is interconnected to the foregoing via one or more buses 118. System memory 116 can be implemented as hardware, firmware, software, or a combination of such. System memory 116 further includes an operating system (OS) 120. Embodiments provide for the system memory 116 to include an image flickering application 122. In various implementations, various processes described herein are performed by image flickering application 122.

Figure 2:
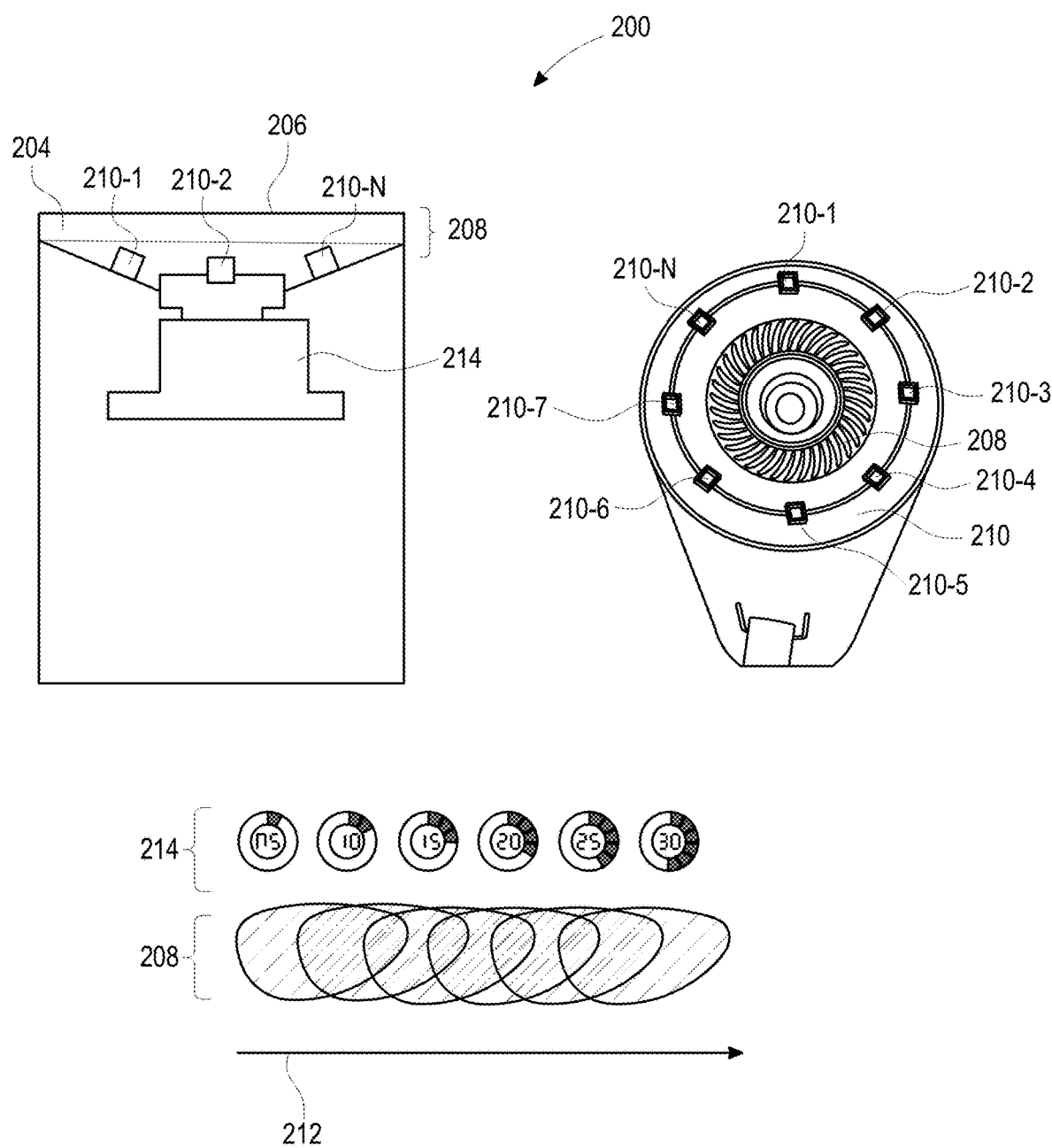
FIG. 2 illustrates a camera or webcam that implements the present invention.

FIG. 2 shows a camera or webcam that implements the present invention. The camera or webcam 200 includes a camera module 202. The camera or webcam 200 can be an I/O device 108 as described in FIG. 1.

A photochromic lens 204 is placed on top and covers the camera or webcam 200. The photochromic lens 204 can be covered with an anti-UV coating or filter 206. The combination of photochromic lens 204 and anti-UV coating or filter 206 is represented as 208. Typically, cameras and webcams may be configured with a clear lens/cover. The use of photochromic lens 204 provides protection and acts a light reducer when strong light conditions occur, such as a strong outdoor light condition is combined with indoor light, such as when a camera or webcam is placed near a window.

Various implementations provide for the camera or webcam 200 to include one or more UV emitters 210-1 to 210-N. The use of the UV emitters 210 is further described herein. In certain configurations, the UV emitters 210 are arranged in a circular even spaced pattern around camera module 202. The anti-UV coating or filter 206 provides for reduction of UV rays sent from the UV emitters 210 which can possibly harm a user.

The photochromic lens 204 (photochromic lens 204 and anti-UV coating 206 or element 208) is an optical lens that darkens on exposure to light of sufficiently high frequency, such as UV radiation. When UV radiation is not present, the photochromic lens 204 returns to a clear or translucent state. The photochromic lens 204 can be made of glass or a plastic, such as polycarbonate.

In certain implementations, silver chloride or another silver halide molecules are embedded in the material of the photochromic lens 204. Such molecules are translucent to visible light in the absence of high frequency radiation (i.e., UV radiation). Other implementations provide for the use of organic photochromic molecules that when exposed to high frequency radiation (i.e., UV radiation) undergo a chemical process that changes the shape of the molecules and absorb visible light causing the photochromic lens 204 to darken. The chemical process is reversed when the photochromic lens 204 high frequency radiation (i.e., UV radiation) is removed, and the photochromic lens 204 returns to a clear or translucent state.

In one sort of technology, molecules of silver chloride or another silver halide are embedded in photochromic lenses. They are translucent visible light without significant ultraviolet component, which is normal for artificial lighting. In another sort of technology, organic photochromic molecules, when exposed to ultraviolet (UV) rays as in direct sunlight, undergo a chemical process that causes them to change shape and absorb a significant percentage of the visible light, i.e., they darken. These processes are reversible; once the lens is removed from strong sources of UV rays the photochromic compounds return to their translucent state.

A range of clear and dark transmittances can be observed. The photochromic lens 204 (photochromic lens 204 and anti-UV coating 206 or element 208) is shown to trans transition from a clear or translucent state to a darken state as high frequency radiation (i.e., UV radiation) is increased and received 212. The amount of darkening is represented by 214.

Figure 3:
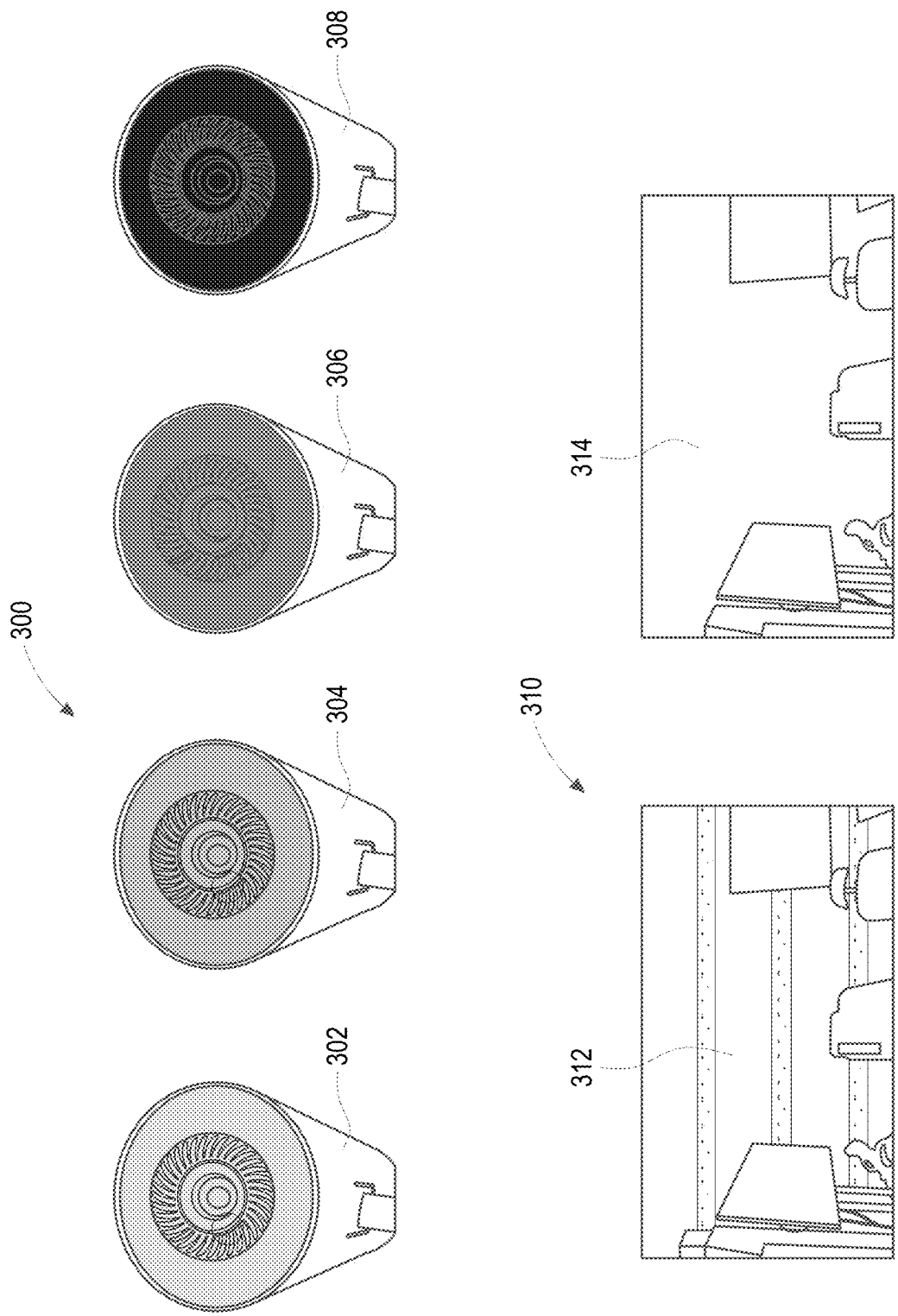
FIG. 3 illustrates webcam conditions and image flickering reduction.

FIG. 3 shows example webcam conditions and image flickering reduction. Webcam 300 shows a normal light condition 302, a light UV condition 304, a mid UV light condition 306, and a high UV condition 308.

312 shows image flickering that is observed on a display, such as a display of an IHS 100, and occurs when a strong outdoor light is mixed with indoor light and captured by the webcam 300. 314 shows a reduction of the image flickering after the photochromic lens 204 darkens accordingly to decrease the shutter speed of the webcam 300.

In a "passive" implementation, which does not rely on computing, the use of photochromic lens 204 covers the camera or webcam. As high frequency radiation (i.e., UV radiation) is received, such as from a strong outdoor light, the photochromic lens 204 darkens, and the shutter speed of the camera or webcam is reduced (e.g., below 1/120 sec) to reduce or eliminate an image flickering condition. The sensor of the camera or webcam senses a reduction in receive light and adjusts the shutter speed automatically.

Implementations provide for an "active" method to reduce or eliminate image flickering. Referring back to FIG. 2, the photochromic lens 204 includes anti-UV coating 206 (Element 208). The camera or webcam 200 include one or more UV emitters 210-1 to 210-N.

The use of the UV emitters 210 is further described herein. In certain configurations, the UV emitters 210 are arranged to provide uniform UV illumination unto the photochromic lens 204. As discussed, the anti-UV coating 206 is used to reduce UV radiation to users from the UV emitters 210.

Implementations provide for monitoring exposure time of an image signal processor or "ISP" 106 described in FIG. 1 and detecting an image flicker scene, wherein the detecting can be performed by the image flickering application 122. For example, if the exposure time (i.e., shutter speed) is less than 1/120 sec and image flicker scene detect is shows an inference of greater than a 50% possibility, the UV emitters 210 are turned on with increasing power providing UV illumination onto the photochromic lens, until the image flicker scene detect has an inference of greater than 10% possibility or exposure time (i.e., shutter speed) is greater than 1/120 sec.

Figure 4:
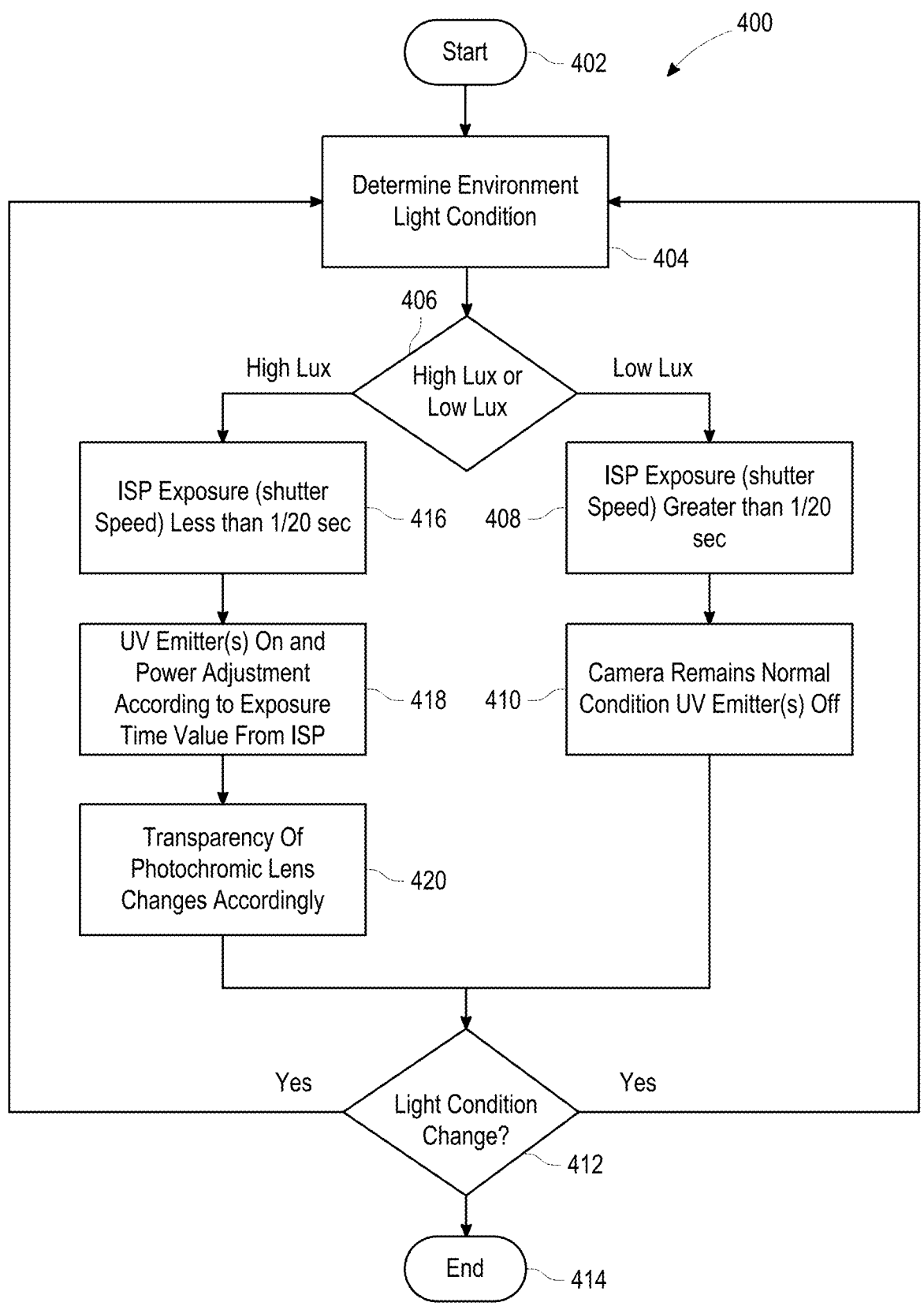
FIG. 4 is a generalized flowchart for reducing image flicker using the exposure time or shutter speed of an image signal processor of an information handling system.

FIG. 4 is a generalized flowchart for reducing image flicker using the exposure time or shutter speed of an IHS image signal processor (ISP). The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. In certain implementations, the by the image signal processor or "ISP" 106 as described in FIG. 1 is used to perform the seps of the described method/process.

At step 402, the process 400 starts. At step 404, a determination is performed as to light condition observed by a camera or webcam of the IHS. A decision is performed at step 406 as to high lux or low condition. Lux being a unit of illuminance, or luminous flux per unit area as defined by the International System of Units. A lux is equal to one lumen per square meter. In photometry, this is used as a measure of the intensity, as perceived by the human eye, of light that hits or passes through a surface.

For a low lux condition, following "low lux" branch of step 406, at step 408, the ISP exposure time or shutter speed is greater than 1/120 sec. At step 410, the camera or webcam maintains a "normal" condition (i.e., no change) and the UV emitters 210 are not turned on (i.e., remain off).

At step 412, a determination is performed if the light condition is changed. If the light condition is changed, following the "Yes" branch of step 412, step 404 is performed. Otherwise, if the light condition has not changed, following the "No" branch of step 412, at step 414, the process 400 ends.

For a high lux condition, following "high lux" branch of step 406, at step 416, the ISP exposure time or shutter speed is less than 1/120 sec. At step 418, the UV emitters 210 are turned on, Power to the UV emitters 210 is adjusted according to exposure time determined by the ISP. At step 420, translucency of the photochromic lens 204 changes according based on UV illumination received by the photochromic lens 204 from the UV emitters 210.

At step 412, a determination is performed if the light condition is changed. If the light condition is changed, following the "Yes" branch of step 412, step 404 is performed. Otherwise, if the light condition has not changed, following the "No" branch of step 412, at step 414, the process 400 ends.

Figure 5:
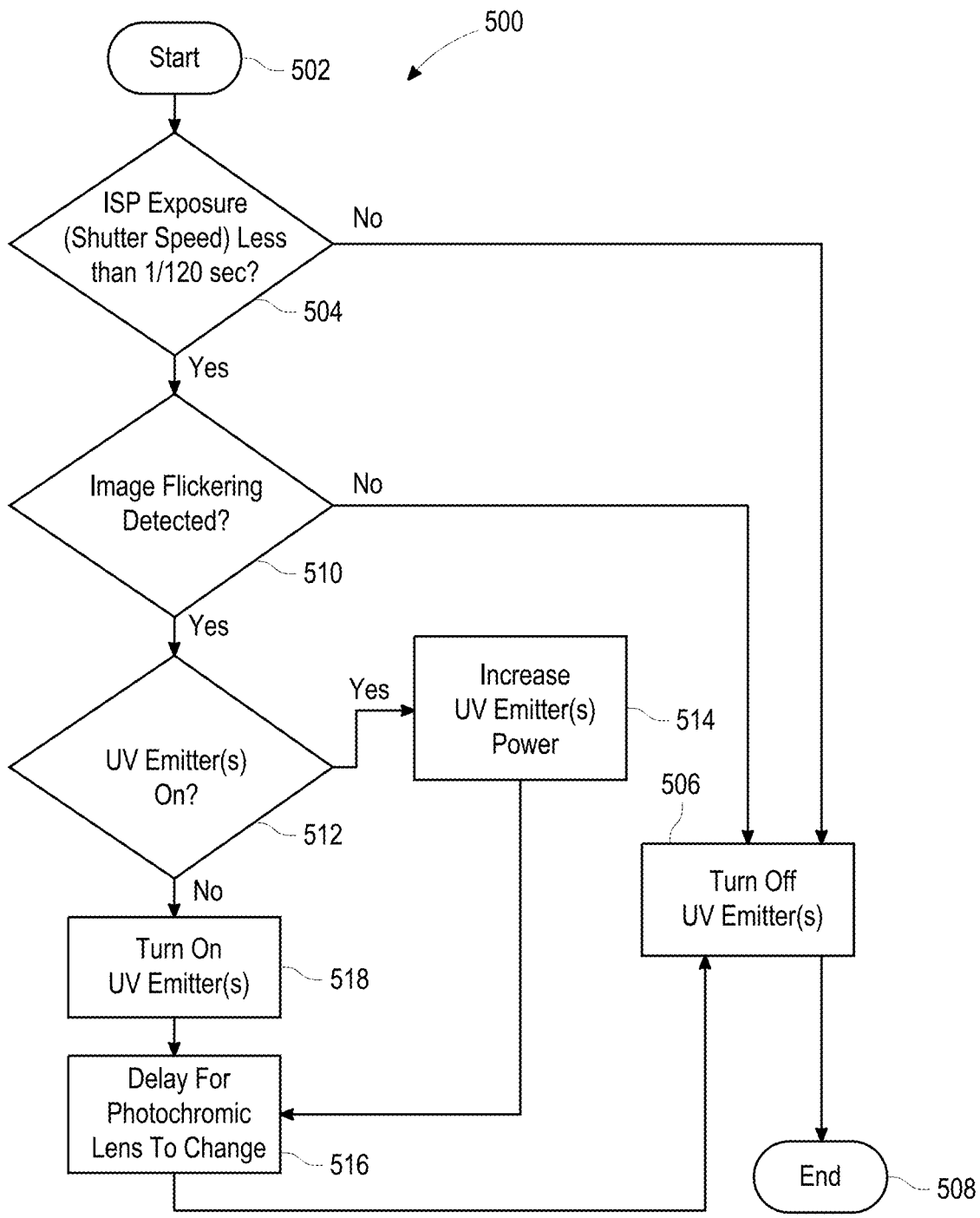
FIG. 5 is a generalized flowchart for reducing image flicker using the image flicker detection of an information handling system.

FIG. 5 is a generalized flowchart for reducing image flicker using the image flicker detection of an IHS. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. In certain implementations, the image flickering application 122 described in FIG. 1 can be used to perform steps of the described method/process.

At step 502, the process 500 starts. At step 504, a determination is performed whether exposure time or shutter speed of an IHS image signal processor (ISP) is less than 1/120 sec. If the exposure time or shutter speed is not less than 1/120 sec (i.e., at or greater than 1/120 sec), then following he "No" branch of step 504, at step 506, the UV emitters 210 are turned off or not turned on. At step 508, the process 500 ends.

If the exposure time or shutter speed is less than 1/120 sec, then following he "Yes" branch of step 504, at step 510, a determination is performed whether image flickering is detected. If image flickering is not detected, following the "No" branch of step 510, at step 506, the UV emitters 210 are turned off or not turned on. At step 508, the process 500 ends.

If image flickering is detected, following the "Yes" branch of step 510, at step 512, a determination is performed whether the UV emitters 210 are turned on. If the UV emitters 210 are turned on, following the "Yes" branch of step 512, at step 514, power to the UV emitters 210 is increased. At step 516, a delay is performed to allow the photochromic lens 204 to transition to appropriate translucency. At step 506, the UV emitters 210 are turned off or not turned on. At step 508, the process 500 ends.

If the UV emitters 210 are not turned on, following the "No" branch of step 512, at step 518, the UV emitters 210 are turned on. At step 516, a delay is performed to allow the photochromic lens 204 to transition to appropriate translucency. At step 506, the UV emitters 210 are turned off or not turned on. At step 508, the process 500 ends.

Figure 6:
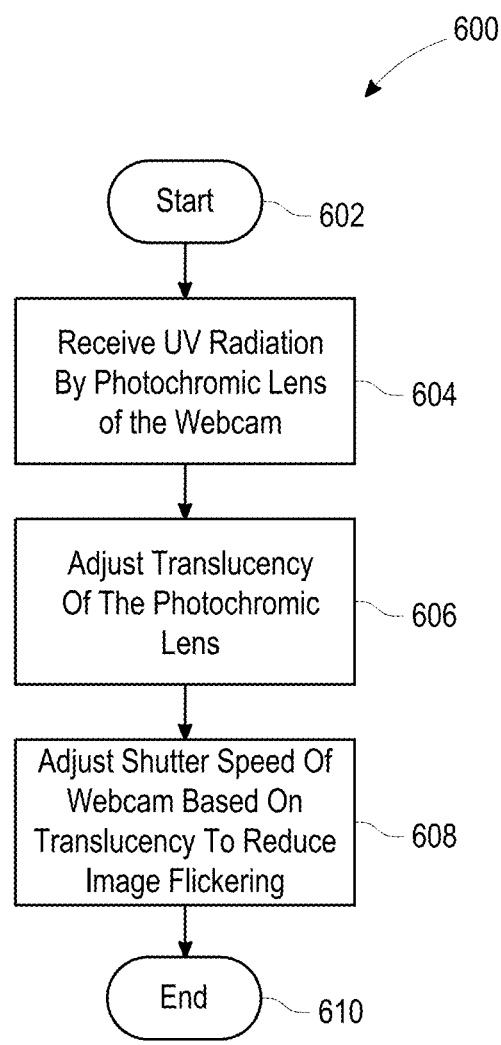
FIG. 6 is a generalized flowchart generalized flowchart for reducing image flickering of a webcam of an information handling system.

FIG. 6 is a generalized flowchart for reducing image flickering of a webcam of an IHS. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. In certain implementations, the image signal processor or "ISP" 106 and/or the image flickering application 122 as described in FIG. 1 can be used to perform steps of the described method/process.

At step 602, the process 600 starts. At step 604, UV radiation is received by the photochromic lens 204. The UV radiation can be from a strong external light source, such as outdoor light, or from the UV emitters 210. The presence of UV radiation relates to an image flickering condition. Image flickering condition can be detected as described in FIG. 4 or FIG. 5, and in such instance the UV emitters 210 are adjusted to provide UV radiation to the photochromic lens 2024.

At step 606, based on the UV radiation received by the photochromic lens 204, translucency of the photochromic lens 204 is changed. The more UV radiation, the less translucency (i.e., the photochromic lens 204 darkens).

At step 608, the shutter speed or exposure time of the webcam is adjusted based on the translucency. The sensor of the webcam receives less light the less the translucency and shutter speed is reduced. At step 610, the process 600 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A method for reducing image flickering of a webcam of an information handling system (IHS) comprising:
   receiving UV radiation by a photochromic lens of the IHS, wherein the UV radiation is from one or more UV emitters of the webcam that are activated when image flickering is detected;
   changing translucency of the photochromic lens based on the received UV radiation; and
   adjusting the shutter speed of the webcam by a sensor of the webcam from light passing through the photochromic lens.

2. The method of claim 1, wherein the photochromic lens is covered with an anti-UV coating or filter.

3. The method of claim 1, wherein the image flickering is detected by a light condition by an image signal processor of the webcam.

4. The method of claim 1, wherein image flickering is detected by a flicker image application of the IHS.

5. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for reducing image flickering of a webcam of an information handling system (IHS), and comprising instructions executable by the processor and configured for:
   receiving UV radiation by a photochromic lens of the IHS, wherein the UV radiation is from one or more UV emitters of the webcam that are activated when image flickering is detected;
   changing translucency of the photochromic lens based on the received UV radiation; and
   adjusting the shutter speed of the webcam by a sensor of the webcam from light passing through the photochromic lens.

6. The system of claim 5, wherein the photochromic lens is covered with an anti-UV coating or filter.

7. The system of claim 5, wherein the image flickering is detected by a light condition by an image signal processor of the webcam.

8. The system of claim 5, wherein the image flickering is detected by a flicker image application of the IHS.

9. A computer-implementable method for reducing image flickering of a webcam of an information handling system (IHS) comprising:
   receiving UV radiation by a photochromic lens of the IHS, wherein the UV radiation is from one or more UV emitters of the webcam that are activated when image flickering is detected;

changing translucency of the photochromic lens based on the received UV radiation; and adjusting the shutter speed of the webcam by a sensor of the webcam from light passing through the photochromic lens.

10. The computer-implementable method of claim 9, wherein the photochromic lens is covered with an anti-UV coating or filter.

11. The computer-implementable method of claim 9, wherein the image flickering is detected by a light condition by an image signal processor of the webcam.

12. The computer-implementable method of claim 9, wherein the image flickering is detected by a flicker image application of the IHS.

\* \* \* \* \*